May 28, 1968  F. L. WIER  3,385,081
CONSTANT VELOCITY UNIVERSAL JOINT
Filed July 14, 1966  2 Sheets-Sheet 1
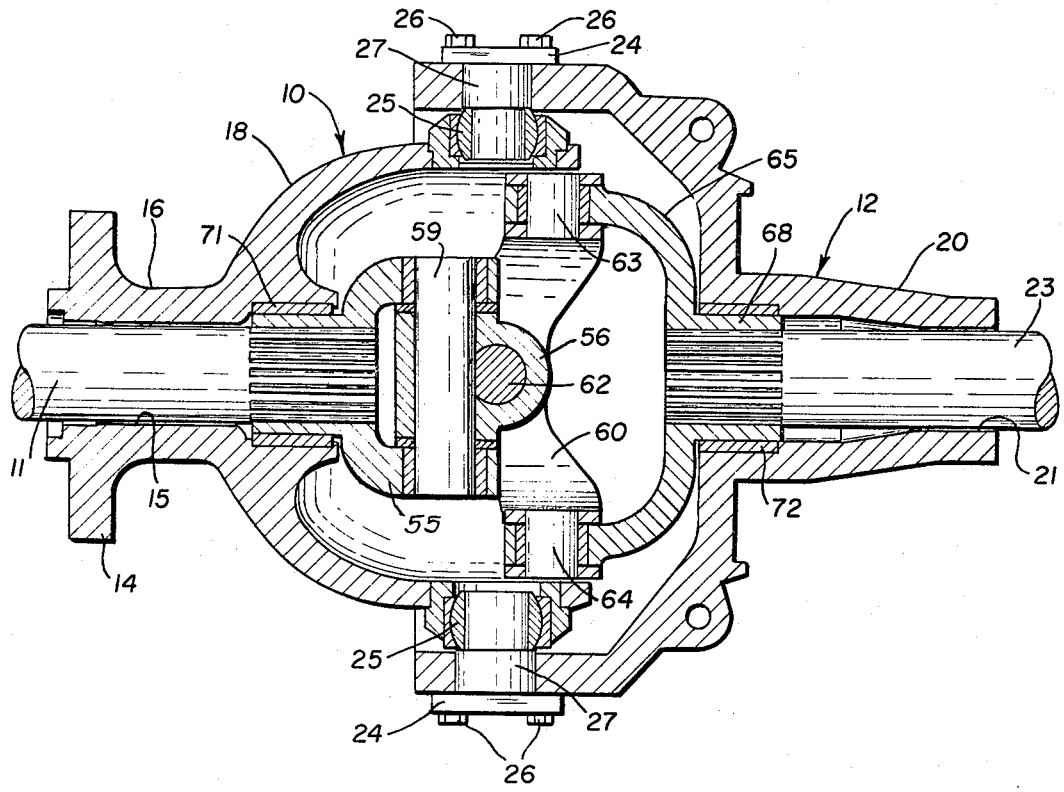
Fig_1
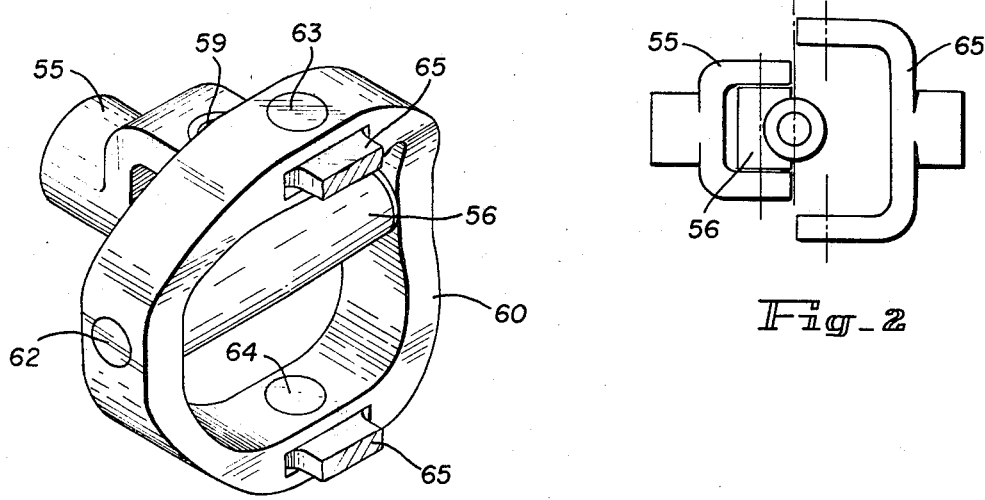
Fig_5
Fig_2
INVENTOR
FRANCIS L. WIER
BY
Richard D. Law
ATTORNEY May 28, 1968  F. L. WIER  3,385,081
CONSTANT VELOCITY UNIVERSAL JOINT
Filed July 14, 1966  2 Sheets-Sheet 2
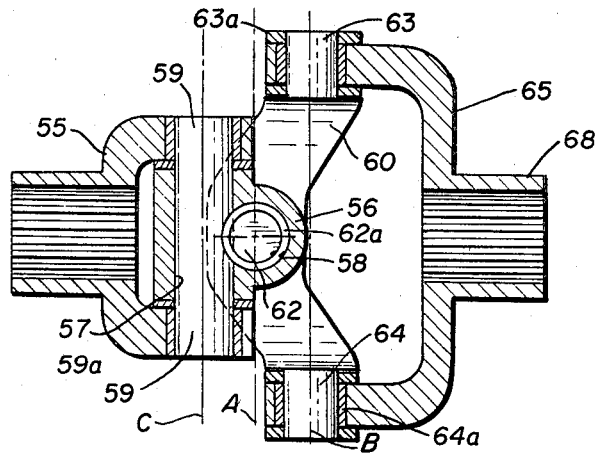
Fig_3
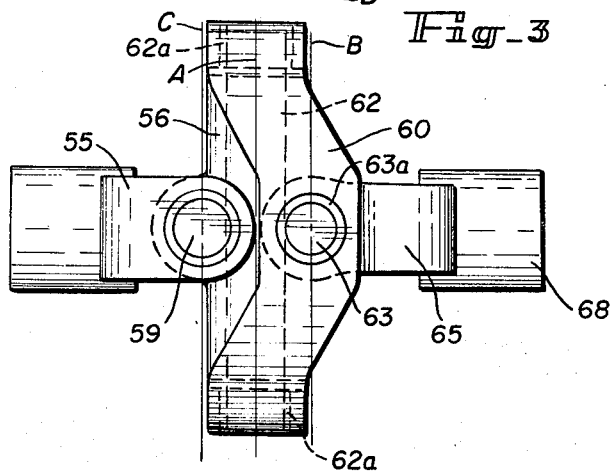
Fig_4
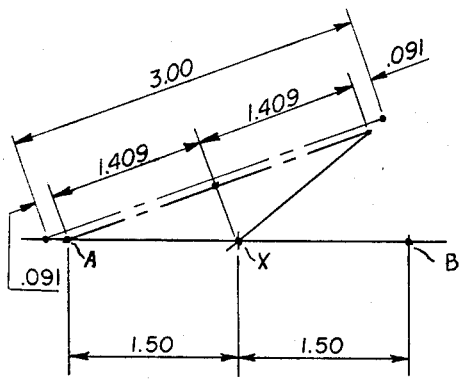
Fig_7
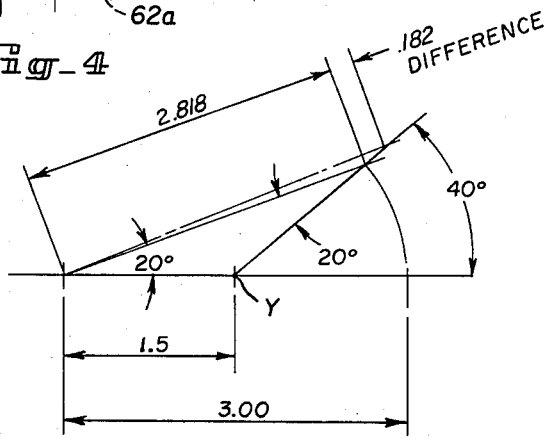
Fig_6
INVENTOR.
FRANCIS L. WIER
BY
Richard D. Law
ATTORNEY United States Patent Office 3,385,081
Patented May 28, 1968

3,385.081
CONSTANT VELOCITY UNIVERSAL JOINT
Francis L. Wier, Englewood, Colo., assignor to The American Coleman Company, Littleton, Colo., a corporation of Nebraska
Continuation-in-part of application Ser. No. 424,643, Jan. 11, 1965. This application July 14, 1966, Ser. No. 565,254
6 Claims. (Cl. 64—21)

ABSTRACT OF THE DISCLOSURE

A wide angle turn, constant velocity universal joint has a drive and a driven shaft each provided with facing yokes arranged at 90° to each other with one yoke pivotally mounted to a shaft and the other pivotally mounted on a ring, and the shaft and ring being pivotally connected together.

Specification

This application is a continuation-in-part of copending application Ser. No. 424,643, filed Jan. 11, 1965, for Steerable Drive Wheel, now abandoned.

This invention relates to universal joints of the constant velocity type, and in one aspect of the invention, to a universal joint of the constant velocity type arranged to produce a wide angle turning steerable drive wheel.

In a conventional non-constant speed universal joint where a driven shaft is arranged at an angle with respect to a driving shaft, there is a difference in the actual speed of the driven shaft which varies several times from a maximum to a minimum during each revolution. As the angle between the two shafts increases, the variation in speed correspondingly increases, which subjects increased stresses on the shafts and on the joint members as the amount of load on the driven shaft increases. Conventional universal joints between two shafts simply cannot stand the stress at angles greater than about 28°. Typically, a universal joint for a steerable drive wheel on a motor vehicle, for example, rarely exceeds about 28° turn angle for the wheel. An increase in the angle of turn on such conventional universal joints subjects the joint to too much stress or strain and failure almost inevitably results. In addition, the geometry of most universal joints will not permit an angle turn between the driven and driving shafts greater than about 28°.

It is, therefore, an object of the present invention to provide an improved constant velocity universal joint which is arranged to provide for a wide angle of turn between the driving and driven shafts.

Another object of the invention is to provide an improved constant velocity universal joint having a high degree of stability at dead center as well as at a turning angle between the driving and driven shafts.

Another object of the invention is to provide an improved constant velocity universal joint in which the joint is essentially free to float on either side of the pivot point of the joint.

A still further object of the invention is to provide a constant velocity universal joint in which there is an overlap of the yokes of the driving and driven shafts to permit a compact joint which is readily adaptable for such purposes as a steerable drive wheel, power shafts and the like.

These and other objects and advantages of the invention may be readily ascertained by referring to the following description and appended illustrations in which:

FIG. 1 is a partial cross-sectional view of a constant velocity joint according to the invention mounted in a steerable drive wheel housing;

FIG. 2 is a schematic diagram showing the pivotal geometry of the two yokes of the driven and driving shafts of the joint according to the invention;

FIG. 3 is a cross-sectional view of a joint according to the invention;

FIG. 4 is a top plan view of the joint of FIG. 3;

FIG. 5 is a perspective view of a portion of the joint of FIG. 3;

FIG. 6 is a diagram of the action of the joint turning through a 40° turn with a floating joint; and FIG. 7 is a diagram of the action of a turn of a joint through a 40° turn with one shaft rigidly mounted and the other floating in the joint.

One effective use of the constant velocity universal joint according to the invention is in a steerable drive wheel for a motor vehicle, and one form thereof is shown in FIG. 1. The steerable drive wheel shown includes a stub 10 which has a hemispherical portion 18 and an outlet 16 through which an axle shaft 11 passes. The stub is provided with a flange 14 for bolting onto an axle housing from a differential, neither of which is shown but is conventional. A spindle 12 is pivotally mounted on the stub 10 to provide steering movement for a wheel, not shown, which is mounted for rotation on the spindle according to conventional practices. The wheel is mounted on bearings in conventional manner, the bearings, not shown, are normally mounted on the spindle extension 20. A passage 21 in the member 20 provides a housing for a stub axle 23 which is attached to a hub for turning a mounted wheel. The spindle is pivotally mounted on the stub by means of bearings 25 at the lower and upper positions thereof, and a pin 27 secured by a plate 24 and bolts 26 connects the spindle with the pivot bearings 25. The universal joint is mounted at one side to the shaft 11 and at its other side to shaft 23. The joint includes a yoke 55 and a yoke 65 joined together, as explained below, with the yoke 55 mounted on the shaft 11 and yoke 65 mounted on the shaft 23. In a preferable form, both the yokes 55 and 65 are mounted on splined shafts, with the spline connection being sufficiently loose to permit axial movement of the yoke in relation to the shaft for the reasons explained below. In another form, one yoke may be rigidly attached to the shaft and the other yoke loosely mounted to permit axial movement of the yoke in relation to the shaft. A cross 56 is pivotally mounted in thrust bearings 59a in the yoke 55 by a pin 59 passing through a passageway 57, FIG. 3, in the cross 56. A pin 62 in passageway 58, which is at right angles to passageway 57, pivotally mounts in thrust bearings 62a in the cross to a ring 60, and the axis of the pin 62 is offset from the axis of the pin 59 by predetermined distances, as explained below. The ring is pivotally mounted in thrust bearings 63a and 64a in the yoke 65 by means of stub pins 63 and 64 in the bifurcated ends of the yoke 65. The axis passing through both of these pins is offset equidistant on the other side of the axis of the pin 62 as the pin 59. When one shaft is turned at an angle to the other shaft the joint parts pivot, maintaining a connection between the two shafts even under rotating conditions. The ring 60 is a warped ring, that is, its pivot connections to the yoke 65 and the cross 56 are offset one from the other to stabilize the joint under operating conditions. The ring, also, is provided with cutout portions adjacent the cross to accommodate the yoke during turning, permitting a 20° to 25° pivot of the yoke. The pin 62 passes through a notch in the pin 59 to lock the pin 59 in position in the yoke.

The joint of the invention utilizes three pivot axes which leaves the ring and cross free to pivot. If all three of the pivot points are in a direct line, i.e., all on the center line shown in FIG. 2, the ring would be unrestrained through part of the arc of rotation and free to flop over, particularly when the wheels are straight away with the driven axle and the driving axle in a straight line. Thus, the ring and the cross, being loose, would be forced from the unrestrained position to a restrained position twice during each revolution, causing high inertia loads and imposing instability. Tests have shown that when all the pivots are in the same plane, the joint is unstable under torque load. Torque causes rings or a ring and a cross to pivot about the center line in a direction corresponding to direction of torque application until rings bump against the closest yoke. Under these conditions, control of velocity is lost and unnecessary forces are introduced. With the two pivots formed by the yokes off-center approximately ¾" or more, a balance is reached whereby control of rings or ring and cross is accomplished to insure stability and equal division of turn angle (which provides constant velocity) as well as minimizing slip and giving minimum physical package dimensions. FIG. 6 illustrates the geometry of the joint housing, and FIG. 7 illustrates the geometry of a joint which is reciprocably mounted on both axle shafts in such a housing. In FIG. 7, the three pivot axes of the joint, that is, the pivot axis B of yoke 65 and the pivot axis A of yoke 55, are offset 1.50 inches from the center pivot X. Thus, with the axles at an angle to each other the ring and the cross are free to pivot and to oscillate on rotation, but the offset position of the axes B and C from the pivot axis X stabilizes the joint. FIG. 6 shows how the distance apart of two points on the joint housing on turning about pivot Y (a center line through pivot bearings 27) is shortened. The contained joint, also, shortens twice in every revolution and it extends twice in every revolution, so the joint must oscillate in the housing, that is, the yokes must reciprocate in the sleeve bearings in the housing and, also, reciprocate on the axles. When the two shafts are turned 40°, the distance between the two yoke pivots at 40° on rotation oscillates about .182 inch, or from 3.00 to 2.818 inches, and the .182 inch must be accounted for by reciprocable movement of the yokes in the housing bearings. The change in dimensions of the joint, due to the oscillation, between the ends of the axle shafts (which are non-slidable in the housing) is accomplished by the reciprocating movement between one or both yokes and the connected shaft. As pointed out above, by permitting the yoke to slide on the axle shaft, the variation in length of the joint is readily accomplished, permitting the joint to oscillate on turning and the joint finds its own position of stability. It is, also, noted that the turn on each axle amounts to one-half of the total turn or 20°, and the oscillation of the joint is accomplished by movement of both yokes on both axle shafts.

As shown in FIG. 7, the joint reciprocates on both axle shafts and in both sleeve bearings in the housing providing a floating joint. The connection between each yoke and its axle shaft and in the housing is arranged for axial sliding movement so that pivoting one shaft 40° in relation to the other causes a sliding of each yoke (in one plane) along its shaft a distance of .091 inch (assuming both yokes move equally). The total movement required is taken up by either or both yoke mountings, thus the joint seeks its own position of stability, oscillating to provide for the difference between foreshortened space and the non-changing dimensions of the yokes. With the configuration shown, the axle shafts are readily turned at 40° to each other with a minimum of stress on the parts during operation. The movement of the parts makes the universal joint a constant velocity joint and the drive and driven shafts rotate at the same speed throughout each revolution.

In actual operation of a steerable drive wheel, it has been found that sleeve bearings 71 and 72 must be provided for the yokes 55 and 65, respectively, in their particular part. These bearings support the yokes in the housing and hold the yokes and the shafts in alignment on sliding movement. The yokes must, of course, slide axially in the sleeve bearings to permit the movement or the floating of the joint, as explained above. One amount offset which has been found very effective for a steerable drive wheel is about three-quarters of an inch from a central pivot point for each yoke, making a total of 1.5 inches; this may be changed, however, for the conditions under which the joint is to operate, as for example the 1.5 inches of the illustrations, taking into consideration the size of the yokes and the ring and cross mounted in the yokes. The ability to turn at 40° at a constant velocity and with minimum strain on the parts produces a new concept in universal joints. The geometry of the joint maintains the total joint very compact and in a minimum package while still permitting the wide angle turn. Due to the geometry of the joint a substantial side thrust occurs between each yoke and its connection to the joint. For optimum life of the joint thrust bearings and/or washers should be inserted at the pivot points of the joint, for example, the thrust bearings 59a, 62a, 63a, etc.

While the invention has been illustrated by reference to a particular embodiment, there is no intent to limit the spirit or scope thereof to the precise details so set forth, for example, the constant velocity joint is valuable for all types of drive lines as well as a steerable drive wheel as described, and the invention is intended to cover other concepts as defined in the following claims.

I claim:

1. A wide angle constant velocity universal joint for a pair of shafts comprising a pair of yokes each having a bifurcated end and each arranged for mounting on the ends of said shafts, at least one of said yokes being arranged to be mounted loosely on its shaft so as to be axially reciprocably movable through a limited distance thereon; a cross including 90° crossed arms pivotally mounted between the bifurcated ends of one of said yokes by opposing arms of said cross; a ring encompassing the other two opposing arms of said cross and pivotally secured thereto; the other said yoke being pivotally mounted on said ring at 90° to the cross pivot connection; and the axis of the pivot for each of said yokes being offset a predetermined and equal distance from the axis through the pivot for said ring and said cross, and said pivot for said ring and said cross being the center of pivot of said shafts.

2. A constant velocity joint according to claim 1 wherein both said yokes are arranged to be reciprocably mounted on said shafts and said joint is a floating joint between said shafts.

3. A constant velocity joint according to claim 1 wherein said cross includes right angle passages intersecting each other a short distance, a pin in one said passage pivotally securing the cross to said yoke and a pin in the other passage pivotally securing said cross to said ring, and one said pin is notched to accommodate the other said pin at the intersection of said passages when mounted therein.

4. A constant velocity joint according to claim 1 wherein said ring is circular about its axis and recurved along its axial extent from the pivot connection with said yoke to the pivot connection with said cross providing cutout portions from said ring permitting offset of said pivot connections and permit a wide angle turn between said yokes and said ring.

5. A constant velocity joint according to claim 1 wherein said ring is recurved sufficiently to permit a 20° turn between said yoke connected to said ring and a 20° turn between said other yoke and said cross for a total of 40° turn between said shafts.

6. A constant velocity joint according to claim 1 wherein said pivot connections are offset from the center pivot connection about 0.75 inch.

References Cited

UNITED STATES PATENTS

| | | | |
|---|---|---|---|
| 1,981,173 | 11/1934 | Herrington | 64—21 X |
| 2,255,762 | 9/1941 | Dodge | 64—21 |
| 2,666,308 | 1/1954 | Bouchard | 64—17 |
| 2,721,458 | 10/1955 | Bouchard | 64—21 |
| 3,145,799 | 8/1964 | Wier et al. | 64—18 X |

HALL C. COE, *Primary Examiner.*